(12) United States Patent
Ramesh et al.

(10) Patent No.: US 10,540,255 B2
(45) Date of Patent: Jan. 21, 2020

(54) STAGED REFINEMENT FOR STATIC ANALYSIS

(71) Applicant: Oracle International Corporation, Redwood Shores, CA (US)

(72) Inventors: Raghavendra Kagalavadi Ramesh, Brisbane (AU); Padmanabhan Krishnan, Brisbane (AU); Francois Gauthier, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 164 days.

(21) Appl. No.: 15/799,256

(22) Filed: Oct. 31, 2017

(65) Prior Publication Data

US 2019/0129826 A1 May 2, 2019

(51) Int. Cl.
*G06F 11/36* (2006.01)
*G06F 21/57* (2013.01)

(52) U.S. Cl.
CPC ........ *G06F 11/3612* (2013.01); *G06F 21/577* (2013.01); *G06F 2221/034* (2013.01)

(58) Field of Classification Search
None
See application file for complete search history.

(56) References Cited

U.S. PATENT DOCUMENTS

| 7,003,507 | B2* | 2/2006 | Tip | G06F 9/449 |
| 7,117,490 | B2* | 10/2006 | Harrison, III | G06F 8/433 717/156 |
| 7,398,516 | B2* | 7/2008 | Berg | G06F 11/3604 717/125 |
| 8,402,439 | B2* | 3/2013 | Gulwani | G06F 8/49 717/126 |
| 9,189,318 | B2* | 11/2015 | Li | G06F 11/3604 |
| 9,807,101 | B1* | 10/2017 | Lu | G06F 21/57 |
| 9,811,322 | B1* | 11/2017 | Sindelar | G06F 8/433 |
| 2007/0282841 | A1* | 12/2007 | Sreedhar | G06F 21/629 |
| 2010/0083240 | A1* | 4/2010 | Siman | G06F 8/433 717/144 |
| 2010/0223599 | A1* | 9/2010 | Ghosh | G06F 11/3608 717/130 |

(Continued)

OTHER PUBLICATIONS

Blackshear, S. et al., "Thresher: Precise Refutations for Heap Reachability", In ACM SIGPLAN Conference on Programming Language Design and Imprelementation, PLDI, pp. 275-286, Jun. 16-19, 2013 (12 pages).

(Continued)

*Primary Examiner* — Chat C Do
*Assistant Examiner* — Douglas M Slachta
(74) *Attorney, Agent, or Firm* — Ferguson Braswell Fraser Kubasta PC

(57) ABSTRACT

A method for analyzing code may include generating, via a flow-insensitive points-to analysis, initial interest points each corresponding to a statement in the code, generating, via a flow-sensitive points-to analysis, flow tuples and refined interest points by removing a subset of the initial interest points, and constructing a flow graph using the refined interest points. The flow graph may include nodes each corresponding to a statement in the code, and edges corresponding to the flow tuples. The method may further include identifying a trace through the flow graph. The trace may include a node corresponding to an interest point of the refined interest points.

19 Claims, 8 Drawing Sheets

(56) References Cited

U.S. PATENT DOCUMENTS

| | | | | |
|---|---|---|---|---|
| 2010/0235817 A1* | 9/2010 | Kahlon | ............... | G06F 11/3604 717/126 |
| 2010/0293530 A1* | 11/2010 | Ivancic | ............... | G06F 11/3608 717/126 |
| 2011/0145799 A1* | 6/2011 | Bartolomeo | ........ | G06F 11/3604 717/132 |
| 2012/0151453 A1* | 6/2012 | Finking | ............... | G06F 11/3612 717/130 |
| 2012/0151461 A1* | 6/2012 | Odaira | .................... | G06F 8/434 717/156 |
| 2014/0344633 A1* | 11/2014 | Li | ....................... | G06F 11/0784 714/57 |
| 2015/0067834 A1* | 3/2015 | Pistoia | .................... | G06F 8/433 726/22 |
| 2016/0110191 A1* | 4/2016 | Allen | .................... | G06F 16/245 717/154 |
| 2016/0224793 A1* | 8/2016 | Lu | ......................... | G06F 21/577 |
| 2016/0306896 A1* | 10/2016 | Paradies | ........... | G06F 16/90335 |
| 2017/0091428 A1* | 3/2017 | Johnson | .................. | G06F 21/10 |
| 2017/0270026 A1* | 9/2017 | Kumar | ............... | G06F 11/3636 |

OTHER PUBLICATIONS

Deutch, D. et al., "Circuits for Datalog Provenance" In 17th International Conference on Database Theory (ICDT), pp. 201-212, Open-Proceedings.org, Mar. 24-28, 2014, Athens, Greece (12 pages).

Allen, N. et al., "Staged Points-To Analysis for Large Code Bases", B. Franke (Ed.) In Lecture Notes on Computer Science book series, vol. 9031, pp. 131-150, 2015 (20 pages).

* cited by examiner

Code 400

```
402 public void publicAPI(T1 a, T2 b) {
    404 a = new T1();
    406 T3 c = new T3();
    408 if(b != null) {
        410 T4 d = m1(b, c); }
    412 doPrivileged(new PrivilegedAction<Integer>() {
        414 public Integer run() {
            416 m2(a, d, c); } }); }
418 private T4 m1(T2 x, T3 y) {
    420 y.f = new Object();
    422 return x.f; }
424 private void m2(T1 p, T4 q, T3 r) {
    426 p.meth1();
    428 q.meth2();
    430 r.meth3(); }
```

FIG. 4A

Code
400

```
402 public void publicAPI(T1 a, T2 b) {
    404 a = new T1();
    406 T3 c = new T3();
    408 if(b != null) {
        410 T4 d = m1(b, c); }
    412 doPrivileged(new PrivilegedAction<Integer>() {
        414 public Integer run() {
            416 m2(a, d, c); } }); }
418 private T4 m1(T2 x, T3 y) {
    420 y.f = new Object();
    422 return x.f; }
424 private void m2(T1 p, T4 q, T3 r) {
            ⋮
    426 p.meth1();
    499 if z q = sanitize(q);
    428 q.meth2(); }
    430 r.meth3(); }
```

FIG. 4C

STAGED REFINEMENT FOR STATIC ANALYSIS

BACKGROUND

Static analysis is an important component in software engineering, mainly in compiler optimization, bug-finding, verification and programmer productivity enhancement. A static analysis identifies and reasons about properties of code (e.g., null dereferencing, buffer overflows, integer overflows, API misuse, and security vulnerabilities such as tainted information flows) without executing the code. Scaling a static analysis to large codebases is a difficult problem. Typically, precision is sacrificed to achieve scalability. That is, an imprecise static analysis may produce false positives. Identifying true reports (e.g., actual defects) is a challenge. Typically, manual investigation of potential defects in the code becomes overwhelming when the percentage of false positives exceeds 5%. In addition, when a static analysis is used to identify defects in large codebases, it is challenging to produce reports with sufficient information to enable programmers to repair the identified defects.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for analyzing code including generating, via a flow-insensitive points-to analysis, initial interest points each corresponding to a statement in the code, generating, via a flow-sensitive points-to analysis, flow tuples and refined interest points by removing a subset of the initial interest points, and constructing a flow graph using the refined interest points. The flow graph includes nodes each corresponding to a statement in the code, and edges corresponding to the flow tuples. The method further includes identifying a trace through the flow graph. The trace includes a node corresponding to an interest point of the refined interest points.

In general, in one aspect, one or more embodiments relate to a system including a processor, and a repository configured to store code. The code includes initial interest points each corresponding to a statement in the code. The system further includes a memory including instructions that, when executed by the processor, cause the processor to generate, via a flow-insensitive points-to analysis, the initial interest points, generate, via a flow-sensitive points-to analysis, flow tuples and refined interest points by removing a subset of the initial interest points, and construct a flow graph using the refined interest points. The flow graph includes nodes each corresponding to a statement in the code, and edges corresponding to the flow tuples. The instructions further cause the processor to identify a trace through the flow graph. The trace includes a node corresponding to an interest point of the refined interest points.

In general, in one aspect, one or more embodiments of the invention relate to a non-transitory computer readable medium including instructions that, when executed by a processor, perform a method for analyzing code including generating, via a flow-insensitive points-to analysis, initial interest points each corresponding to a statement in the code, generating, via a flow-sensitive points-to analysis, flow tuples and refined interest points by removing a subset of the initial interest points, and constructing a flow graph using the refined interest points. The flow graph includes nodes each corresponding to a statement in the code, and edges corresponding to the flow tuples. The method further includes identifying a trace through the flow graph. The trace includes a node corresponding to an interest point of the refined interest points.

Other aspects of the invention will be apparent from the following description and the appended claims.

BRIEF DESCRIPTION OF DRAWINGS

FIG. 4A, FIG. 4B, FIG. 4C, and FIG. 4D show examples in accordance with one or more embodiments of the invention.

DETAILED DESCRIPTION

Figure 1:
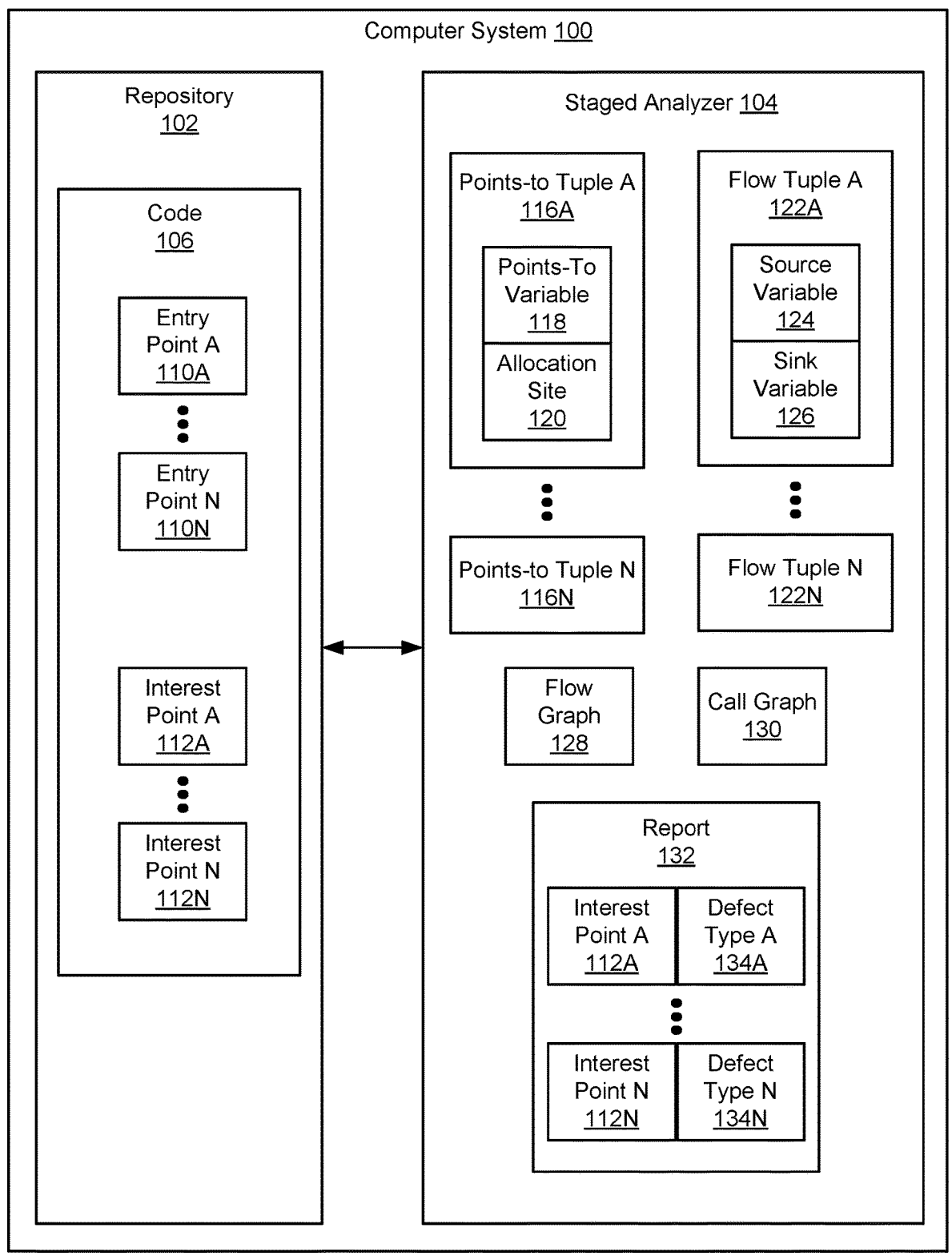
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention are directed to a system, method, and non-transitory computer readable medium for analyzing code. In one or more embodiments, initial interest points (e.g., statements) in the code are identified via a flow-insensitive points-to analysis that identifies interest points that satisfy a property of the code. For example, the property may correspond to a defect type, such as a security violation or an integer overflow. Refined interest points may then be generated, via a flow-sensitive points-to analysis (e.g., an analysis that considers both control flows and data flows), by removing a subset of the initial interest points. In one or more embodiments, a flow graph is generated for a subset (e.g., slice) of the code relevant to the refined interest points. The flow graph may represent chains of statements through which values flow (e.g., via a series of assignment statements). A trace (e.g., path) through the flow graph may be identified that includes a node corresponding to an interest point of the refined interest points. For example, in a security analysis, if a specific property is satisfied in any trace through the flow graph between an entry point to the code and the interest point, a security violation may be flagged. In one or more embodiments, by analyzing the flow of control and data in one or more traces, it may be determined that an interest point corresponds to a "false positive" that does not correspond to a defect. In addition, it may be determined whether the trace includes a node corresponding to a sanitizer statement that eliminates the defect type.

FIG. 1 shows a computer system (100) in accordance with one or more embodiments of the invention. As shown in FIG. 1, the computer system (100) includes a repository (102) and a staged analyzer (104). In one or more embodiments, the computer system (100) takes the form of the computing system (500) described with respect to FIG. 5A and the accompanying description below, or takes the form of the client device (525) described with respect to FIG. 5B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (106). In one or more embodiments, the code (106) may be any collection of source code including various software components. That is, the code (106) may be any collection of computer instructions written in a human-readable programming language. The code (106) may be transformed by a compiler into binary machine code. Compiled machine code may then be executed by a processor (e.g., contained in computer system (100)) in order to execute the software components generated from the code (106).

In one or more embodiments, the code (106) may include function definitions. In one or more embodiments, a function definition is a subset of the computer instructions of the code (106). For example, a function definition may be a procedure or a method.

In one or more embodiments, the code (106) may be represented in a procedural or imperative programming language (e.g., Java). In one or more embodiments, the code (106) may be represented in a declarative programming language. For example, declarative code may be expressed in Datalog as a set of relations (i.e., facts) and rules (i.e., clauses). A relation may express facts as one or more tuples. Declarative code may express what should be accomplished without expressing a sequence of instructions (i.e., a control flow) to accomplish the goal. Said another way, declarative code (e.g., as opposed to procedural or imperative code) may be code in which the logic of a computation is expressed without describing its control flow. Declarative code may seek to minimize side effects by describing what should be accomplished rather than how to accomplish a goal.

In one or more embodiments, the code (106) includes entry points (110A, 110N) and interest points (112A, 112N). In one or more embodiments, an entry point (110N) is a statement in the code (106). In one or more embodiments, an entry point (110N) is where an external program invokes the code (106). For example, an entry point (110N) may implement an application program interface (API). Alternatively, in one or more embodiments, an entry point (110N) is a variable, or a field of an object.

In one or more embodiments, an interest point (112N) is a statement in the code (106). Alternatively, in one or more embodiments, an interest point (112N) is a variable, or a field of an object. In one or more embodiments, an interest point (112N) may be identified in a result of a points-to analysis. For example, the points-to analysis may detect interest points (112A, 112N) that satisfy a property of the code (106) (e.g., where the property corresponds to a defect type (134A, 134N), such as a security violation).

Continuing with FIG. 1, in one or more embodiments, the staged analyzer (104) may be implemented in hardware (e.g., circuitry), software, firmware, and/or any combination thereof. In one or more embodiments, the staged analyzer (104) includes points-to tuples (116A, 116N), flow tuples (122A, 122N), a flow graph (128), a call graph (130), and a report (132).

In one or more embodiments, the staged analyzer (104) includes functionality to generate points-to tuples (116A, 116N) by performing a points-to analysis for the code (106). In one or more embodiments, the points-to tuples (116A, 116N) may be generated via a flow-insensitive analysis (e.g., a 2O+1H context-sensitive points-to analysis). For example, a flow-insensitive points-to analysis may be used to generate the points-to tuples (116A, 116N) because a performing a more precise, flow-sensitive points-to analysis may exhaust the available computational resources of the computer system (100) or require more than 24 hours to complete, due to the size of the code (106).

In one or more embodiments, each points-to tuple (116N) includes a variable (118) and an allocation site (120) for an object, such that the variable (118) may point to the allocation site (120) during the execution of the code (106). A variable (118) may be a symbol (e.g., 'x', 'y', 'input', 'result') that references a location in the code (106) where a value is stored, such as an allocation site (120). In one or more embodiments, a variable (118) may be a field of an object. An allocation site (120) may be a statement in the code (106) that declares, instantiates, and/or initializes an object. For example, an allocation site (120) A::x=new T( ) assigns a new object instance of type T to the variable (118) x, where the allocation site (120) is labeled 'A'. In one or more embodiments, the allocation site (120) (e.g., for a base object) may be referred to by the label associated with a 'new' statement. A variable (118) may refer to a simple allocation site (120) (e.g., a numerical or string value), may refer to a complex allocation site (120) (e.g., a base object or structure containing one or more fields), or may refer to a field in a complex allocation site (120). The allocation site (120) may contain different values at different points in time. In one or more embodiments, the allocation site (120) may refer to a location in a memory (e.g., a heap memory) of the computer system (100) that is allocated when a function definition in the code (106) that includes the allocation site (120) is executed.

In one or more embodiments, the staged analyzer (104) includes functionality to generate flow tuples (122A, 122N) by performing a points-to analysis for the code (106). In one or more embodiments, the flow tuples (122A, 122N) may be generated via a flow-sensitive analysis that considers the order in which statements in the code (106) may be executed. In one or more embodiments, the flow tuples (122A, 122N) may be generated for a subset (e.g., a slice) of the code (106) relevant to specific interest points (112A, 112N). For example, the points-to analysis may be an on-demand (e.g., client-based) points-to analysis performed relative to specific interest points (112A, 112N).

In one or more embodiments, each flow tuple (122N) includes a source variable (124) and a sink variable (126), such that a value (e.g., an allocation site (120)) associated with the source variable (124) may flow to the sink variable (126) during the execution of the code (106). In other words, each flow tuple (122N) may correspond to a potential assignment of the value of the source variable (124) to the sink variable (126).

In one or more embodiments, both the source variable (124) and the sink variable (126) are variables (118) as defined above. The terms source variable (124) and sink variable (126) indicate the role of a variable (118) within a flow tuple (122N). That is, a specific variable (118) may play the role of sink variable (126) in a first flow tuple (i.e., the variable (118) may be assigned a value from a source variable (124) in the first flow tuple) and also may play the role of source variable (124) in a second flow tuple (i.e., a value flows from the variable (118) to a sink variable (126) in the second flow tuple).

In one or more embodiments, the flow between the source variable (124) and a sink variable (126) may be an inter-procedural flow. That is, local variable flows due to assignments within a function definition may be excluded from the analysis (e.g., because many local flows within a function definition may be short and localized within the code and may therefore be straightforwardly reconstructed, if necessary). In other words, the source variable (124) may be defined in a first function definition of the code (106) and the sink variable (126) may be defined in a second function definition of the code (106). For example, the value of the source variable (124) may be passed as an actual parameter from function definition f which calls function definition f', where the sink variable (126) may be a formal parameter of function definition f'. Alternatively, the value of the source variable (124) may be returned from function definition f' to the calling function definition f, where the sink variable (126) in function definition f may be assigned the value returned by function definition f'.

Continuing with FIG. 1, in one or more embodiments, the staged analyzer (104) includes functionality to generate a flow graph (128) during the points-to analysis (e.g., a flow-sensitive points-to analysis). The flow graph (128) may include nodes each corresponding to a statement in the code (106), where the flow of control between statements is indicated via edges between nodes. In one or more embodiments, an edge of the flow graph (128) may correspond to a flow tuple (122N) that defines a flow between a source variable (124) and a sink variable (126). For example, an edge (s, t) in the flow graph (128) may indicate that statement t is executed after statement s, such that a value (e.g., an allocation site (120)) flows from the source variable (124) defined in statement s to the sink variable (126) defined in statement t.

The flow graph (128) may include a chain of statements in the code (106) (e.g., corresponding to flow tuples (122A, 122N)) through which an allocation site (120) flows to a series of variables starting from the statement in which a variable (118) is directly assigned the allocation site (120). The flow graph (128) may include several such chains of statements for each points-to tuple (116N).

In one or more embodiments, the staged analyzer (104) includes functionality to generate a call graph (130) during a points-to analysis. The call graph (122) may include nodes each corresponding to a statement in the code (106) that corresponds to a function definition, where the flow of control between function definitions is indicated via edges between nodes. For example, an edge (f, g) in the call graph (130) may indicate that function definition f calls function definition g.

In one or more embodiments, the staged analyzer (104) may include functionality to generate a report (132) that includes interest points (112A, 112N) and defect types (134A, 134N). For example, the report (132) may indicate that an interest point (112N) corresponds to a defect type (134N) (e.g., the defect type (134N) may be a security vulnerability). Examples of defect types (134A, 134N) may include: null dereferencing, buffer overflows, integer overflows, API misuse, and security vulnerabilities such as tainted information flows. Defect types (134A, 134N) may be specific to a programming language. In one or more embodiments, a sanitizer statement in the code (106) may transform a value (e.g., a potentially tainted value) associated with the defect type (134N) into a value that is not associated with the defect type (134N). In one or more embodiments, the report (132) may be stored as a document capable of being accessed by an interested entity (e.g., a programmer).

While FIG. 1 shows a configuration of components, other configurations may be used without departing from the scope of the invention. For example, various components may be combined to create a single component. As another example, the functionality performed by a single component may be performed by two or more components.

Figure 2:
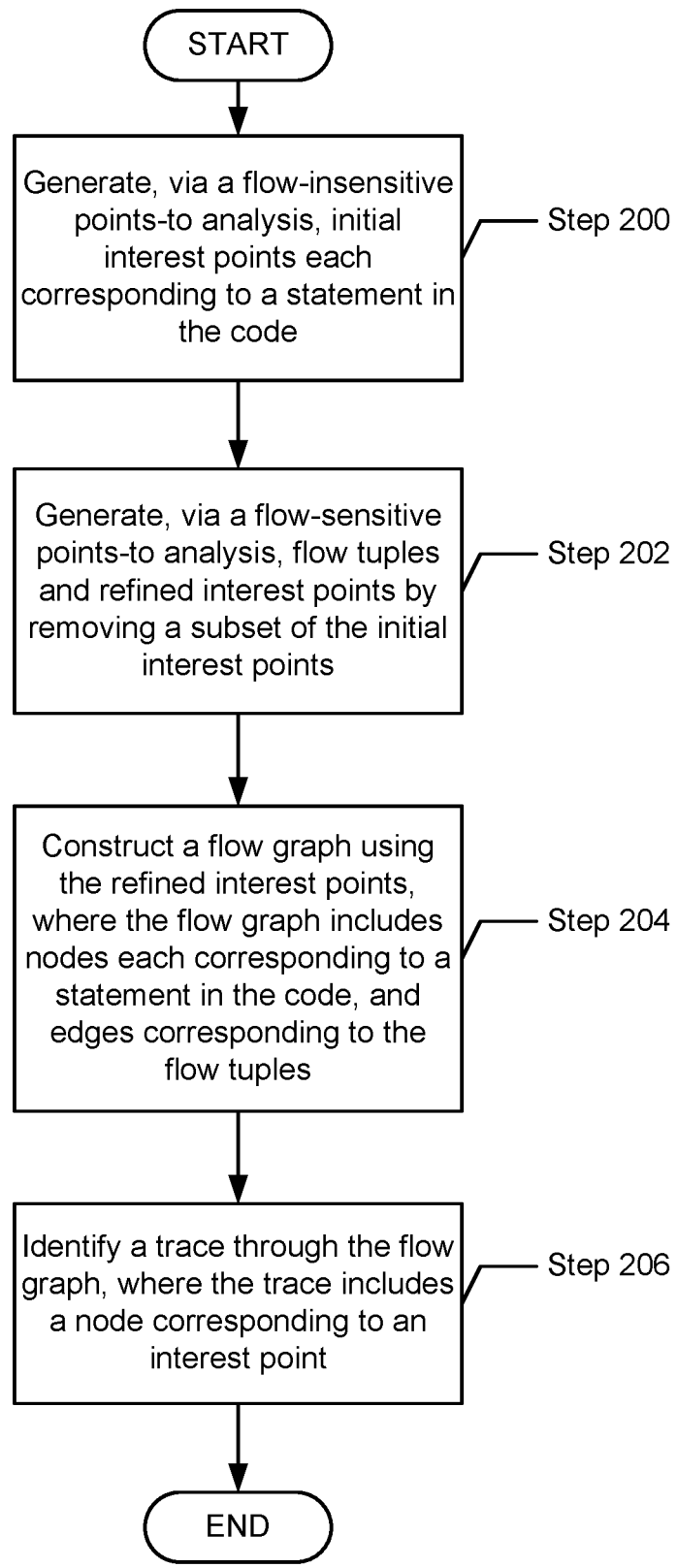
FIG. 2 and FIG. 3 show flowcharts in accordance with one or more embodiments of the invention.

FIG. 2 shows a flowchart in accordance with one or more embodiments of the invention. The flowchart depicts a process for analyzing code. One or more of the steps in FIG. 2 may be performed by the components (e.g., the staged analyzer (104)) of the computer system (100), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, initial interest points are generated via a flow-insensitive points-to analysis. In one or more embodiments, an interest point is a statement in the code. In one or more embodiments, the points-to analysis may detect interest points that satisfy a property of the code. For example, the property may correspond to a defect type, such as a security violation. In one or more embodiments, a flow-insensitive points-to analysis may be used (e.g., because a performing a more precise, flow-sensitive points-to analysis may exhaust the available computational resources of the computer system, due to the size of the code). In one or more embodiments, the points-to analysis generates points-to tuples each including a variable and an allocation site for an object, such that the variable may point to the allocation site during the execution of the code. In one or more embodiments, the allocation site may refer to a location in a memory (e.g., a heap memory) of the computer system that is allocated when the function definition that includes the allocation site is executed.

In one or more embodiments, a call graph is generated during the points-to analysis. The call graph may include nodes each corresponding to a statement in the code that corresponds to a function definition, where the flow of control between function definitions is indicated via edges between nodes.

In Step 202, flow tuples and refined interest points are generated, via a flow-sensitive points-to analysis, by removing a subset of the initial interest points. In one or more embodiments, the flow tuples are generated for a subset (e.g., slice) of the code relevant to the initial interest points. That is, the flow-sensitive points-to analysis may be an "on-demand" analysis restricted to the subset of the code relevant to the initial interest points generated in Step 200 above. In one or more embodiments, the flow-sensitive points-to analysis reuses (i.e., does not recompute) the points-to tuples and the call graph generated in Step 200 above. The points-to tuples may be used to track the flow of values among variables in the code.

In one or more embodiments, each flow tuple includes a source variable and a sink variable, such that a value (e.g., an allocation site) of the source variable may flow to the sink variable during the execution of the code. That is, each flow tuple may correspond to a potential assignment of the value of the source variable to the sink variable. In one or more embodiments, the flow between the source variable and a sink variable may be an interprocedural flow. That is, local variable flows due to assignments within a function definition may be excluded from the analysis. In other words, the source variable may be defined in a first function definition of the code and the sink variable may be defined in a second function definition of the code.

In one or more embodiments, the flow-sensitive analysis determines possible flows of values between variables relative to the results (e.g., interest points, points-to tuples and call graph) generated by the flow-insensitive analysis performed in Step 200 above. In one or more embodiments, the refined interest points are generated by removing a subset of the initial interest points as a result of determining the possible data flows. For example, it may be determined that a property (e.g., a security flaw or an integer overflow) does not manifest at an initial interest point relative to the possible data flows generated by the flow-insensitive analysis, in which case the initial interest point may be removed from consideration.

In Step 204, a flow graph is constructed using the refined plurality of interest points. In one or more embodiments, the flow graph includes nodes each corresponding to a flow tuple and a statement in the code, where the flow of control between statements is indicated via edges between nodes. An edge of the flow graph may correspond to a flow tuple that defines a flow between a source variable and a sink variable. For example, an edge (s, t) in the flow graph may indicate that statement t is executed after statement s, such that a value (e.g., an allocation site) flows from the source variable defined in statement s to the sink variable defined in statement t. The flow graph may include a chain of statements through which an allocation site flows (e.g., via a series of assignments) to a series of variables starting from the local variable that is directly assigned the allocation site. The flow graph may include several such chains for each points-to tuple generated in Step 200 above.

In one or more embodiments, the flow graph may be restricted to interprocedural edges between statements in different function definitions. That is, local variable flows due to assignments within a function definition may be excluded from the flow graph. In other words, the source variable may be defined in a first function definition of the code and the sink variable may be defined in a second function definition of the code. For example, the edges of the flow graph may correspond to a subset of the edges of the call graph.

In Step 206, a trace through the flow graph is identified. In one or more embodiments, the trace is a path that includes a node corresponding to an interest point of the refined interest points. For example, the trace may terminate on the node corresponding to the interest point. In one or more embodiments, the trace may begin at a node corresponding to an entry point to the code. In one or more embodiments, an entry point is a statement in the code where an external program invokes the code. For example, an entry point may implement an API. In one or more embodiments, multiple traces between the entry point and the interest point may be identified. For example, in a security analysis, if a specific property is satisfied in any trace through the flow graph between the entry point and the interest point, a security violation may be flagged. In one or more embodiments, a shortest trace (e.g., a trace between an entry point and an interest point with the fewest number of nodes) may be identified by applying a graph algorithm (e.g., Dijkstra's shortest path algorithm) to the flow graph. In one or more embodiments, the trace may begin at a node corresponding to a specific type of statement (e.g., a privilege elevation statement).

In one or more embodiments, by analyzing the flow of control and data in one or more traces that include an initial interest point, it may be determined that the initial interest point corresponds to a "false positive" that does not correspond to a defect (e.g., falsely identified due to the imprecision of a flow insensitive-points to analysis performed in Step 200 above), and may be removed from consideration.

In one or more embodiments, intraprocedural nodes and edges may be added to the trace to provide additional detail regarding intraprocedural control and data flows during debugging. For example, one or more traces through the flow graph may be used by a programmer to reason about whether a property is actually satisfied at an interest point (e.g., to evaluate a potential defect in the code manifesting at the interest point).

Figure 3:
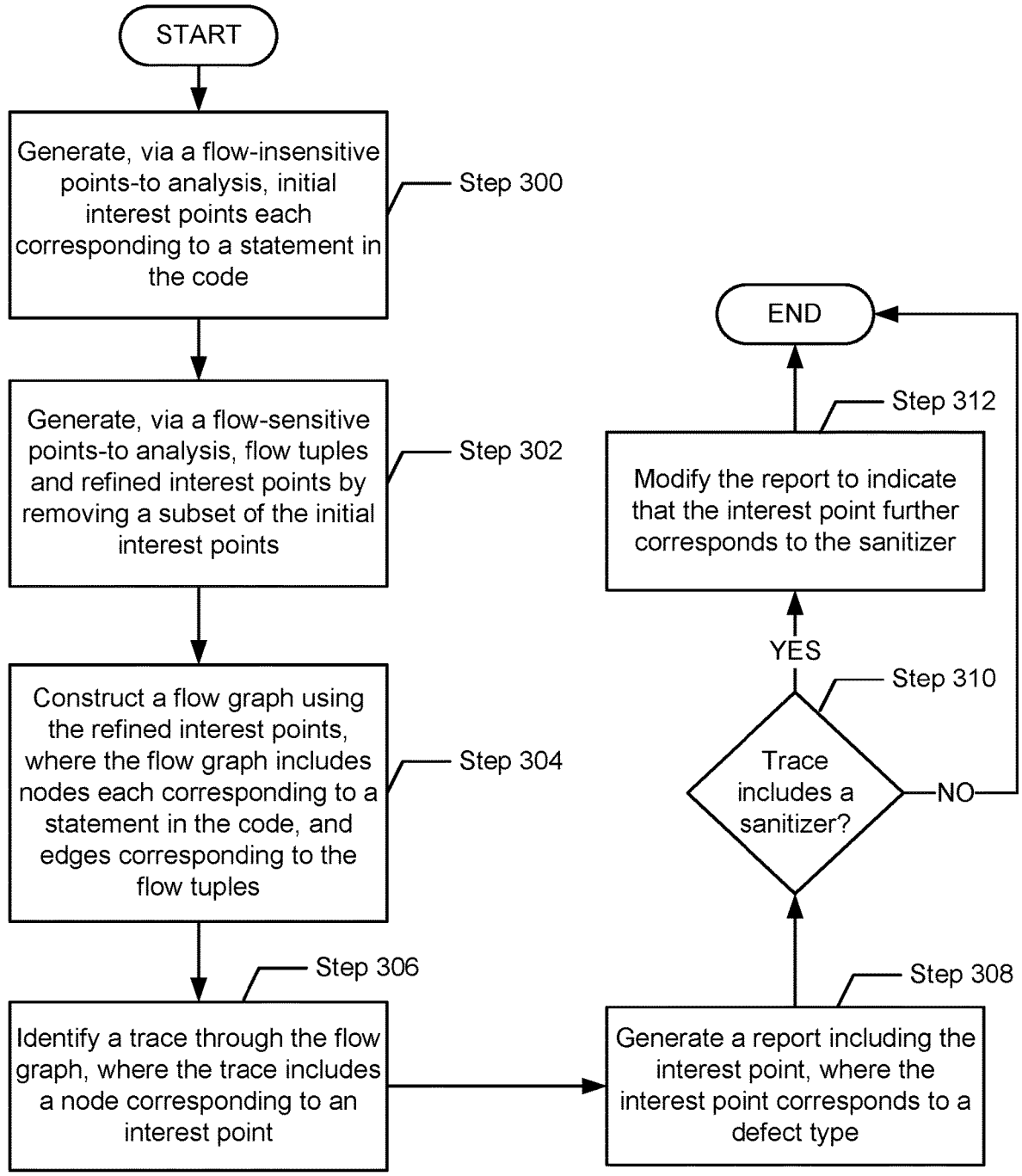

FIG. 3 shows a flowchart in accordance with one or more embodiments of the invention. The flowchart depicts a process for analyzing code. One or more of the steps in FIG. 3 may be performed by the components (e.g., the staged analyzer (104)) of the computer system (100), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, initial interest points are generated via a flow-insensitive points-to analysis (see description of Step 200 above).

In Step 302, flow tuples and refined interest points are generated, via a flow-sensitive points-to analysis, by removing a subset of the initial interest points (see description of Step 202 above).

In Step 304, a flow graph is constructed using the refined plurality of interest points (see description of Step 204 above).

In Step 306, a trace through the flow graph is identified (see description of Step 206 above).

In Step 308, a report including an interest point is generated. In one or more embodiments, the interest point corresponds to a defect type. The defect type may correspond to a property of the code detected by the points-to analyses performed in Step 300 and/or Step 302 above. Examples of defect types may include: null dereferencing, buffer overflows, integer overflows, API misuse, and security vulnerabilities such as tainted information flows.

In Step 310, it is determined whether the trace includes a node corresponding to a sanitizer statement corresponding to the defect type and preceding the node corresponding to the interest point in the trace. In one or more embodiments, the sanitizer statement may apply a transformation that eliminates the defect. For example, if the defect is a type of security vulnerability, the defect may be eliminated by replacing potentially dangerous characters (e.g., in potentially malicious scripts) with harmless equivalents.

If Step 310 determines that the node corresponding to the sanitizer statement precedes the node corresponding to the interest point in the trace, then in Step 312, the report is modified to indicate that the interest point further corresponds to the sanitizer statement (i.e., the sanitizer is applied before the potentially tainted input reaches the interest point). For example, it may be useful for a programmer examining the report to know about the presence of the sanitizer statement in order to enable the programmer to determine whether the interest point corresponds to an actual defect or a false positive. Depending on the objectives of the points-to analyses, it may be useful to examine all flows (e.g., traces) that include the interest point and the sanitizer statement, or just one flow (e.g., corresponding to a shortest path) that includes the interest point and the sanitizer statement. In one or more embodiments, if the staged analyzer determines that the node corresponding to the sanitizer statement precedes the node corresponding to the interest point in each trace through the flow graph, then the staged analyzer may automatically remove the interest point from the refined interest points.

Those skilled in the art and having the benefit of this Detailed Disclosure will understand that Step 306, Step 308, Step 310, and Step 312 of FIG. 3 may be executed for each interest point of the refined interest points identified in Step 304.

The following example is for explanatory purposes only and not intended to limit the scope of the invention. FIG. 4A, FIG. 4B, FIG. 4C, and FIG. 4D show an implementation example in accordance with one or more embodiments of the invention.

FIG. 4A illustrates a snippet of code (400) for which a tainted information analysis is to be performed by the staged analyzer (104). The tainted information analysis checks for function invocations on potentially tainted objects within the scope of a privilege elevation statement that are reachable from public entry points. An object may be considered tainted if the object is generated externally to the code (400) (e.g., the object is based on user input or is received from an external software application). Assuming that the code (400) is part of a library, the formal parameters (including the this variable) of public APIs and their fields are considered taint sources. The code (400) includes statements (426, 428, 430) corresponding to invocations of security-sensitive function definitions within the scope of a privilege elevation statement (412) that permits access to a security-sensitive resource of a computer system (e.g., computer system (100)). That is, statements (426, 428, 430) invoke security-sensitive function definitions that access the security-sensitive resource.

Variable a is overwritten in statement (404) and does not carry tainted data when a is passed as a parameter to the m2 function definition, where the value of a is assigned to formal variable p of m2. Therefore, when a is referenced at statement (426), a is not tainted. Variable c is assigned in statement (406) so c does not carry tainted data when passed as a parameter to m2, where the value of c has been assigned to formal variable r of m2. Therefore, when c is referenced at statement (430), c is not tainted. However, statement (428) represents a potential security vulnerability because variable d is tainted, due to x.f being a taint source (e.g., variable d is assigned the value of x.f when m1 returns). Therefore, the tainted information analysis should identify statement (428) as a security vulnerability.

Initially, in the first stage, the staged analyzer (104) performs a flow-insensitive points-to analysis, which identifies both statement (426) and statement (428) as interest points (i.e., security vulnerabilities). Statement (426) is identified as an interest point because the flow-insensitive analysis does not strongly update the taint information for assignments within a function definition such as the assignment at statement (404). That is, although the variable a is initially tainted, since it comes from an external source, a is overwritten in statement (404), thereby overwriting any potentially tainted value. Statement (430) is not identified as an interest point because it is clear even to the flow-insensitive analysis that variable c never receives a potentially tainted value. The function invocation at statement (410) is not identified as an interest point since it is not within the scope of the privilege elevation statement (412).

In the second stage, the staged analyzer (104) performs a flow-sensitive points-to analysis to validate the interest points (i.e., security vulnerabilities) identified by the flow-insensitive points-to analysis. At this second stage, only the portions of the code (400) relevant to the initial interest points (426, 428) generated in the first stage are considered. For example, statement (420) is ignored at the flow-sensitive stage since it is irrelevant to the initial interest points (426, 428).

Figure 4B:
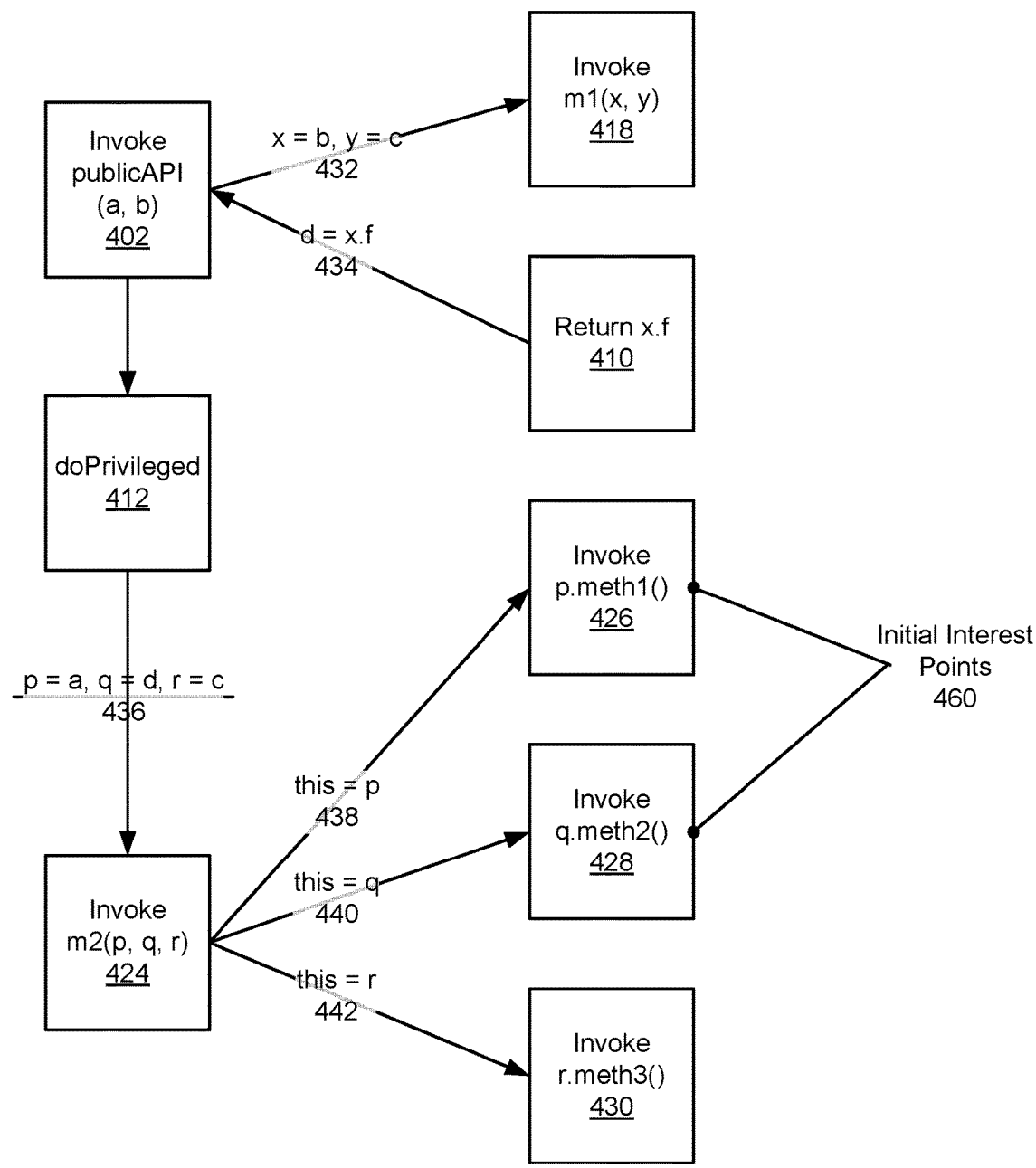

In the second stage, the staged analyzer (104) constructs a flow graph (450), as shown in FIG. 4B, using the results (e.g., the points-to tuples and the call graph) generated by the flow-insensitive analysis in the first stage. The flow graph (450) begins at the entry point to the code (400), that is, when the publicAPI function is entered at statement (402). Formal parameters a and b to publicAPI are considered to be potentially tainted.

The edge (432) in the flow graph (450) from statement (402) to statement (418) corresponds to the interprocedural assignment of formal parameters x and y of m1 to the values of variables b and c provided by publicAPI. Similarly, the edge (434) from statement (402) to statement (410) corresponds to the interprocedural assignment of variable d of publicAPI to the return value x.f of m1.

The edge (436) in the flow graph (450) from statement (412) to statement (424) corresponds to the interprocedural assignment of formal parameters p, q, and r of m2 to the values of variables a, d, and c provided by publicAPI. The edge (438) in the flow graph (450) from statement (424) to statement (426) corresponds to the interprocedural assignment of the this variable of meth1 to the value of variable p provided by m2. Similarly, the edge (440) in the flow graph (450) from statement (424) to statement (428) corresponds to the interprocedural assignment of the this variable of meth2 to the value of variable q provided by m2. Lastly, the edge (442) in the flow graph (450) from statement (424) to statement (430) corresponds to the interprocedural assignment of the this variable of meth3 to the value of variable r provided by m2.

In the second stage, the staged analyzer (104) determines that statement (426) does not represent a security vulnerability because variable a is not tainted when it is passed (i.e., since a is re-assigned in statement (404)), in statement (416), to the function definition m2. Therefore, the staged analyzer (104) removes statement (426) from the initial interest points (460), leaving a single security vulnerability, at statement (428). Statement (426) may be thought of as a "false positive" generated during the first (flow-insensitive)

stage, since statement (426) does not represent a true security vulnerability. The staged analyzer (104) then generates a report that includes statement (426) as a security vulnerability.

FIG. 4C illustrates an alternate scenario where the code (400) includes a sanitizer statement (499) that transforms (if condition z is true) the tainted variable q into an equivalent value that is safe. In this alternate scenario, the report generated by the staged analyzer (104) indicates that statement (428) also corresponds to the sanitizer statement (499).

Figure 4D:
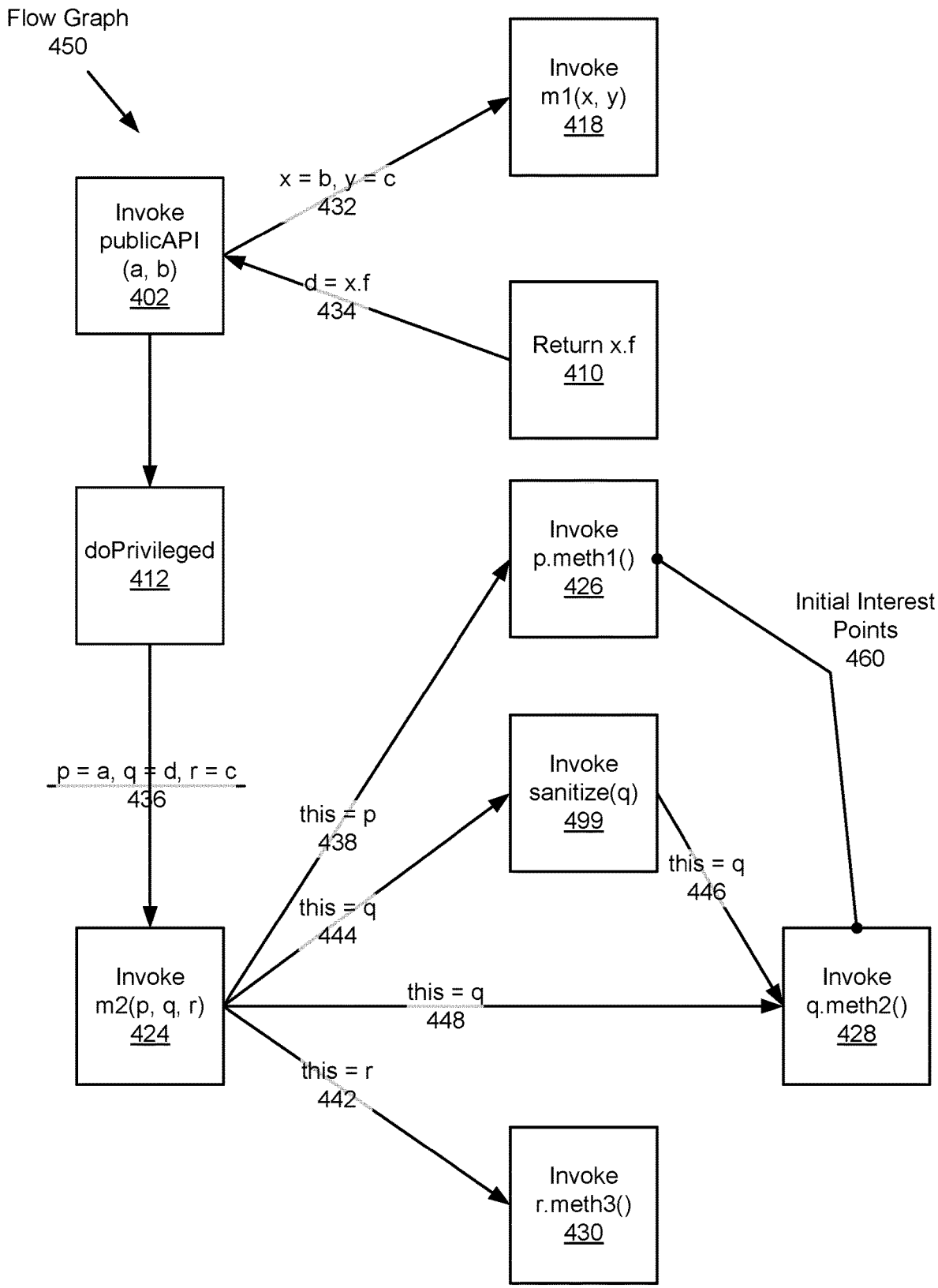

FIG. 4D illustrates the flow graph (450) corresponding to this alternate scenario. FIG. 4D shows that edge (444) from statement (424) to statement (499) corresponds to the interprocedural assignment of the this variable of sanitize to the value of variable q provided by m2. Similarly, the edge (446) from statement (499) to statement (428) corresponds to the interprocedural assignment of the this variable of meth2 to the value of variable q provided by sanitize. Lastly, the edge (448) from statement (424) to statement (428) corresponds to an alternate path in the flow graph (450) based on the interprocedural assignment of the this variable of meth2 to the (un-sanitized, and therefore still tainted) value of variable q provided by m2.

The staged analyzer (104) determines, during the second (i.e., flow-sensitive) stage, whether it is possible for the tainted value of variable q from statement (424) to reach (i.e., via edge (448)) the security-sensitive function definition meth2 in statement (428). That is, if the staged analyzer (104) can determine that each trace through the flow graph (450) includes the node corresponding to the sanitizer statement (499), then the staged analyzer (104) concludes that the tainted value is sanitized in each trace. Therefore, statement (428) does not correspond to a security vulnerability, and the staged analyzer (104) removes statement (428) from the initial interest points (460).

Figure 5A:
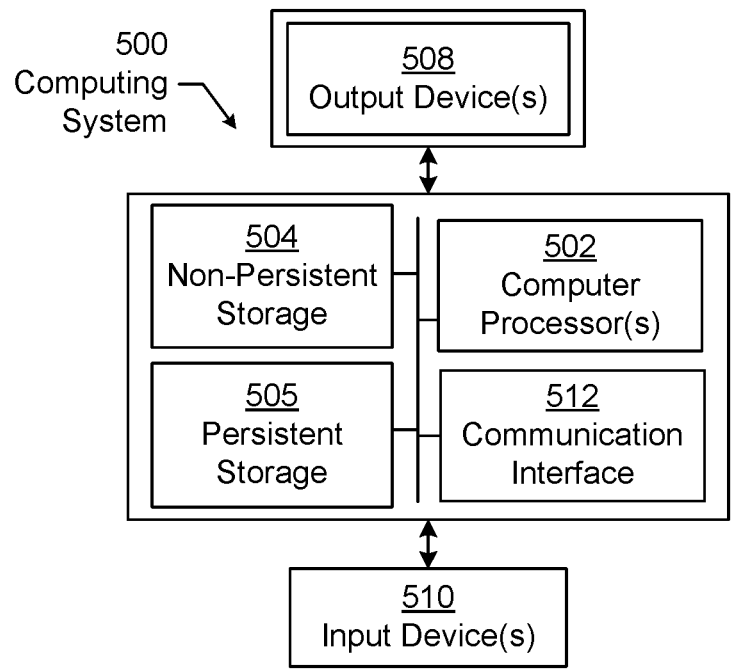
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (505) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (505). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
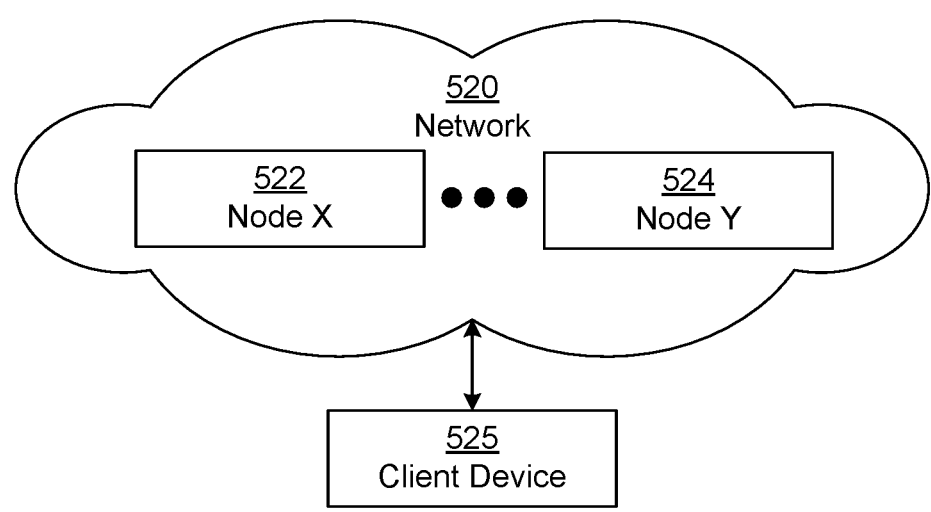

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (525). For example, the nodes may be part of a cloud computing system. The nodes may include functionality to receive requests from the client device (525) and transmit responses to the client device (525). The client device (525) may be a computing system, such as the computing system shown in FIG. 5A. Further, the client device (525) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing code, comprising:
generating, via a flow-insensitive points-to analysis, an initial plurality of interest points, a plurality of points-to tuples, and a call graph, the initial plurality of interest points each corresponding to a statement in the code, each of the plurality of points-to tuples comprising a points-to variable and an allocation site that refers to a location in a memory of a computer system allocated when the code is executed, wherein the flow-insensitive points-to analysis is independent of data flows and control flows among statements in the code;
generating, via a flow-sensitive points-to analysis and using the plurality of points-to tuples and the call graph, a plurality of flow tuples and a refined plurality of interest points by removing a subset of the initial plurality of interest points, wherein the flow-sensitive points-to analysis is based on data flows and control flows among the statements in the code;
constructing a flow graph using the refined plurality of interest points, wherein the flow graph comprises:
a plurality of nodes each corresponding to a statement in the code, and
a plurality of edges corresponding to the plurality of flow tuples; and
identifying a trace through the flow graph, wherein the trace comprises a first node corresponding to a first interest point of the refined plurality of interest points.

2. The method of claim 1, further comprising:
generating a report comprising the first interest point, wherein the first interest point corresponds to a first defect type.

3. The method of claim 2, further comprising:
determining that the trace further comprises a second node corresponding to a sanitizer statement, wherein the sanitizer statement corresponds to the first defect type, wherein the second node precedes the first node in the trace; and
modifying the report to indicate that the first interest point further corresponds to the sanitizer statement.

4. The method of claim 1, further comprising:
determining that the trace further comprises a second node corresponding to a statement that permits access to a resource of a computer system,
wherein the second node precedes the first node in the trace,
wherein the first interest point corresponds to a statement that accesses the resource, and
wherein the first interest point corresponds to a security violation.

5. The method of claim 1,
wherein each of the plurality of flow tuples comprises a source variable and a sink variable,
wherein the source variable and the sink variable are defined in different functions of the code, and
wherein the source variable is the points-to variable in a points-to tuple of the plurality of points-to tuples.

6. The method of claim 1, wherein the flow graph further comprises a second node corresponding to an entry point where the code is invoked by an external program.

7. The method of claim 1, wherein the trace is identified using a shortest-path graph algorithm.

8. A system, comprising:
a processor;
a repository configured to store code, wherein the code comprises an initial plurality of interest points each corresponding to a statement in the code; and
a memory comprising instructions that, when executed by the processor, cause the processor to:
generate, via a flow-insensitive points-to analysis, the initial plurality of interest points, a plurality of points-to tuples, and a call graph, the initial plurality of interest points each corresponding to a statement in the code, each of the plurality of points-to tuples comprising a points-to variable and an allocation site that refers to a location in a memory of a computer system allocated when the code is executed, wherein the flow-insensitive points-to analysis is independent of data flows and control flows among statements in the code;
generate, via a flow-sensitive points-to analysis and using the plurality of points-to tuples and the call graph, a plurality of flow tuples and a refined plurality of interest points by removing a subset of the initial plurality of interest points, wherein the flow-sensitive points-to analysis is based on data flows and control flows among the statements in the code;
construct a flow graph using the refined plurality of interest points, wherein the flow graph comprises:
a plurality of nodes each corresponding to a statement in the code, and
a plurality of edges corresponding to the plurality of flow tuples; and
identify a trace through the flow graph, wherein the trace comprises a first node corresponding to a first interest point of the refined plurality of interest points.

9. The system of claim 8, wherein the system further comprises a report comprising the first interest point, wherein the first interest point corresponds to a first defect type, wherein the memory further comprises instructions that, when executed by the processor, cause the processor to:
generate the report.

10. The system of claim 9, wherein the memory further comprises instructions that, when executed by the processor, cause the processor to:
determine that the trace further comprises a second node corresponding to a sanitizer statement, wherein the sanitizer statement corresponds to the first defect type, wherein the second node precedes the first node in the trace; and
modify the report to indicate that the first interest point further corresponds to the sanitizer statement.

11. The system of claim 8, wherein the memory further comprises instructions that, when executed by the processor, cause the processor to:
determine that the trace further comprises a second node corresponding to a statement that permits access to a resource of the system,
wherein the second node precedes the first node in the trace,
wherein the first interest point corresponds to a statement that accesses the resource, and
wherein the first interest point corresponds to a security violation.

12. The system of claim 8,
wherein each of the plurality of flow tuples comprises a source variable and a sink variable,
wherein the source variable and the sink variable are defined in different functions of the code, and
wherein the source variable is the points-to variable in a points-to tuple of the plurality of points-to tuples.

13. The system of claim 8, wherein the flow graph further comprises a second node corresponding to an entry point where the code is invoked by an external program.

14. The system of claim 8, wherein the trace is identified using a shortest-path graph algorithm.

15. A non-transitory computer readable medium storing instructions that, when executed by a processor, perform a method for analyzing code, the method comprising:
generating, via a flow-insensitive points-to analysis, an initial plurality of interest points, a plurality of points-to tuples, and a call graph, the initial plurality of interest points each corresponding to a statement in the code, each of the plurality of points-to tuples comprising a points-to variable and an allocation site that refers to a location in a memory of a computer system allocated when the code is executed, wherein the flow-insensitive points-to analysis is independent of data flows and control flows among statements in the code;
generating, via a flow-sensitive points-to analysis and using the plurality of points-to tuples and the call graph, a plurality of flow tuples and a refined plurality of interest points by removing a subset of the initial plurality of interest points, wherein the flow-sensitive points-to analysis is based on data flows and control flows among the statements in the code;
constructing a flow graph using the refined plurality of interest points, wherein the flow graph comprises:
a plurality of nodes each corresponding to a statement in the code, and
a plurality of edges corresponding to the plurality of flow tuples; and
identifying a trace through the flow graph, wherein the trace comprises a first node corresponding to a first interest point of the refined plurality of interest points.

16. The non-transitory computer readable medium of claim 15, wherein the method further comprises:
generating a report comprising the first interest point, wherein the first interest point corresponds to a first defect type.

17. The non-transitory computer readable medium of claim 16, wherein the method further comprises:
determining that the trace further comprises a second node corresponding to a sanitizer statement, wherein the sanitizer statement corresponds to the first defect type, wherein the second node precedes the first node in the trace; and modifying the report to indicate that the first interest point further corresponds to the sanitizer statement.

18. The non-transitory computer readable medium of claim 15, wherein the method further comprises:

determining that the trace further comprises a second node corresponding to a statement that permits access to a resource of a computer system, wherein the second node precedes the first node in the trace, wherein the first interest point corresponds to a statement that accesses the resource, and wherein the first interest point corresponds to a security violation.

19. The non-transitory computer readable medium of claim 15, wherein each of the plurality of flow tuples comprises a source variable and a sink variable, wherein the source variable and the sink variable are defined in different functions of the code, and wherein the source variable is the points-to variable in a points-to tuple of the plurality of points-to tuples.

* * * * *